US007517373B2

(12) United States Patent
Sakai et al.

(10) Patent No.: US 7,517,373 B2
(45) Date of Patent: Apr. 14, 2009

(54) REFORMER

(75) Inventors: Kenji Sakai, Chiba (JP); Kunio Hirotani, Chiba (JP)

(73) Assignee: Toyo Engineering Corporation, Tokyo (JP)

( * ) Notice: Subject to any disclaimer, the term of this patent is extended or adjusted under 35 U.S.C. 154(b) by 657 days.

(21) Appl. No.: 11/168,309

(22) Filed: Jun. 29, 2005

(65) Prior Publication Data

US 2005/0287053 A1 Dec. 29, 2005

(30) Foreign Application Priority Data

Jun. 29, 2004 (JP) .............................. 2004-191299

(51) Int. Cl.
*B01J 8/00* (2006.01)
*B01J 8/06* (2006.01)
(52) U.S. Cl. .................... 48/127.9; 48/61; 422/201; 422/197; 422/198; 422/205; 422/196; 422/220; 422/148; 165/81
(58) Field of Classification Search .............. 48/61; 422/196, 198, 200–202; 165/135
See application file for complete search history.

(56) References Cited

U.S. PATENT DOCUMENTS

| | | | | |
|---|---|---|---|---|
| 2,145,877 A | * | 2/1939 | Houdry | 422/198 |
| 4,337,170 A | | 6/1982 | Fuderer | 252/373 |
| 4,650,651 A | * | 3/1987 | Fuderer | 422/191 |
| 4,690,690 A | | 9/1987 | Andrew et al. | 48/214 A |
| 4,904,455 A | * | 2/1990 | Karafian et al. | 422/201 |
| 4,919,844 A | | 4/1990 | Wang | 252/373 |
| 4,990,481 A | | 2/1991 | Sato et al. | 502/335 |
| 5,100,857 A | | 3/1992 | Sato et al. | 502/335 |
| 5,167,933 A | * | 12/1992 | Norsk | 422/148 |

FOREIGN PATENT DOCUMENTS

| | | |
|---|---|---|
| JP | 56-109286 | 8/1981 |
| JP | 61-58801 | 3/1986 |
| JP | 3442167 | 6/2003 |
| JP | 3450876 | 7/2003 |
| WO | WO 94/29013 | 12/1994 |

OTHER PUBLICATIONS

Girish Joshi et al, "Application of the Kellogg Reforming Exchanger System to Large Scale Methanol Plants", The M.W. Kellogg Company, Houston, Texas, USA. Presented to 1995 World Methanol Conference Phoenix, Arizona USA Dec. 5-7, 1995, pp. 163-179.

* cited by examiner

*Primary Examiner*—Alexa D. Neckel
*Assistant Examiner*—Kaity V. Handal
(74) *Attorney, Agent, or Firm*—Oblon, Spivak, McClelland, Maier & Neustadt, P.C.

(57) ABSTRACT

A device to reform a raw material gas into a synthesis gas rich in hydrogen and carbon monoxide is disclosed. The device includes a vessel, a floating head, a plurality of reaction tubes, inlets and outlets for raw material and heating gases, and a cooled fixed tube plate.

19 Claims, 10 Drawing Sheets

(a)  (b)

though their own combustion gas may have been recirculated into the reactor. In this case, however, such a reformer poses problems in that the reaction at the portion remote from the burner is delayed, causing the temperature of the raw material gas to be lower than the expected temperature,

REFORMER

BACKGROUND OF THE INVENTION

1. Field of the Invention

The present invention relates to a reformer for producing a synthesis gas from a raw material, such as a natural gas. More particularly, it relates to a heat exchanger type reformer which produces a synthesis gas rich in hydrogen and carbon monoxide by reforming, with steam, a raw material, such as a hydrocarbon gas, by utilizing a high-temperature gas as a heating source.

2. Background of the Invention

There is known a heat exchanger type reformer that utilizes combustion gas or a high-temperature gas obtained from a secondary reformer as a heating source to cause a hydrocarbon to react with steam (reformed) in the presence of a catalyst to produce a gas that is rich in hydrogen and carbon monoxide.

Conventionally, heat exchanger type reformers, as disclosed in U.S. Pat. No. 4,690,690 and Japanese Patent No. 3442167, comprise a bayonet tube, in which an inner tube is inserted in an outer tube wherein the gap between the outer tube and the inner tube is packed with a catalyst. The high-temperature gas is introduced into the reformer from the closed side of the outer tube and caused to flow on the outside surface of the outer tube, by which heat necessary for the reforming reaction is transferred to the raw material gas flowing in a catalyst. In such reformers, one end of the bayonet tube (usually a lower end) is not mechanically fixed, but is free to move in the axial direction of the tube by thermal expansion, which offers an advantage that mechanical problems, such as buckling and tensile fracture caused by thermal expansion of the tube, are less likely to occur. However, loading and unloading of the catalyst is difficult because the catalyst must be loaded into or unloaded from an annular portion between the outer and inner tubes while avoiding an obstacle created by a manifold of the inner tubes in an upper region. Also, the catalyst is sometimes broken during operation because of axial movement caused by a difference in thermal expansion between the outer and inner tubes. Further, since the bayonet tube has a double tube structure, the outline of the tube is thick and the diameter of the reformer is large. And since a raw material gas introduction section and a reformed gas discharge section are provided on one side of the reformer, the reformer is complicated in structure, making it difficult to increase the size of the reformer.

Japanese Patent Laid-Open No. 56-109286, Japanese Patent Laid-Open No. 61-58801, Japanese Patent No. 3450876, and Joshi et al. ("Application of the Kellogg Reforming Exchanger System to Large Scale Methanol Plants", Girish Joshi et al., 1995 World Methanol Conference Phoenix, Ariz. USA, Dec. 5-7, 1995) have disclosed a reformer in which the above-noted problems are solved. This reformer has a structure in which the reaction tube loaded with the catalyst has a single-tube structure instead of the bayonet tube; one end of the tube opens inside the reformer; the reformed gas discharged from the open end of the tube is mixed with the high-temperature gas supplied from the outside of the system, e.g., from a secondary reformer; and the mixed gas is caused to flow on the outside of the tube, by which heat necessary for the reforming reaction is transferred to the raw material gas flowing in the tube. For this type of reformer, as in the case of the bayonet tube, one end (usually a lower end) of tube is not mechanically fixed, but is free to move in the axial direction of the tube by thermal expansion, which offers an advantage that mechanical problems, such as buckling and tensile fracture caused by thermal expansion of the tube, are likely less to occur. Also, the catalyst is easily loaded and unloaded, and not broken as often during operation. Also, this reformer has a relatively simple structure, thus making it easier to meet the requirement for an increase in size of the reformer. However, the raw material gas supplied into the catalyst layer in the tube undergoes reforming reaction to a certain level and thereafter is usually mixed in the reformer with the high-temperature gas, which has been separately reformed outside the system to a point where residual methane is scarcely present. In addition, after giving off heat necessary for the reforming reaction to the raw material gas in the reaction tube, the mixed gas is discharged from the reformer and sent to succeeding cooling and condensed-water separating processes. Therefore, in this case, the reformed gas is sent to the next process in a state in which a considerable amount of unreacted methane component remains, so that the methane conversion efficiency decreases, while in the case of the reformer using the bayonet tube, the reformed gas coming out of the reformer is further sent to the secondary reformer, and is reformed to a state in which residual methane is scarcely present. Further, the high-temperature gas introduced from the outside of the system gives off heat necessary for the reforming reaction to the raw material gas flowing in the reaction tube after being mixed with the reformed gas having a temperature 150 to 200° C. lower than that of the high-temperature gas thereby lowering the temperature of the high-temperature gas. Therefore, the temperature of the high-temperature gas is hardly utilized effectively, and the heat transfer efficiency decreases. Also, in principle, the reformers of this type cannot be used with a high-temperature gas that cannot be mixed with the process gas (i.e., the raw material gas and the reformed gas obtained by reforming the raw material gas). For example, this type of reformers cannot be used when the high-temperature gas is helium heated by fission heat of a nuclear reactor.

WO 94/29013 discloses a reformer in which the high-temperature gas for giving heat necessary for the reforming reaction is not introduced from the secondary reformer, but from a combustion reaction zone provided in the reformer. In this reformer, the entire construction is a one-pass floating head multi-tubular heat exchanger type, where the catalyst is loaded in tubes and thermal expansion of the tubes is absorbed by two kinds of bellows provided at a floating head portion and at each tube of a fixed-side tube plate portion. For this reformer, however, the floating head has an ordinary floating head structure consisting of a flat-metal tube plate and a metallic floating head cover, and the construction is such that a floating head tube plate is protected from the high-temperature gas introduced into the reformer only by a heat insulating material provided on the back surface of the tube plate. Therefore, high thermal stress is likely to occur at the floating head, so that it is difficult to use this reformer in applications in which the high-temperature gas is introduced directly from the outside of the reformer. Also, the reformer of this type is unsuitable for a large-size reformer because the thermal stress occurring at the floating head is especially remarkable in a large-size reformer.

Reforming catalysts have been disclosed in U.S. Pat. Nos. 4,990,481, 5,100,857, for example.

SUMMARY OF THE INVENTION

An object of the present invention is to provide a reformer which can restrain the occurrence of problems caused by thermal expansion and thermal stress without decreasing the methane conversion efficiency and heat transfer efficiency while having a structure suitable for a larger size reformer. Another object of the present invention is to provide a reformer capable of using a wide range of gases as the high-temperature heat source necessary for the reforming reaction.

The present invention provides a reformer for obtaining a reformed gas from a raw material gas, wherein the reformer has a vessel and, in the vessel, a reaction tube having a region for containing a reforming catalyst is provided; a channel is provided by partitioning the vessel by a fixed tube plate; one end of the reaction tube is connected to the fixed tube plate whereby the interior of the reaction tube communicates with the channel; the other end of the reaction tube is connected to a floating head via a first flexible tube joint, whereby the interior of the reaction tube communicates with the interior of the floating head; the vessel is equipped with a raw material gas inlet; the channel is equipped with a reformed gas outlet; the floating head is connected to the raw material gas inlet via a second flexible tube joint; an inlet and an outlet of heating gas for heating the reaction tube are provided for the vessel between the fixed tube plate and the floating head; the inlet of the heating gas is located at a position closer to the fixed tube plate than to the floating head; the outlet of the heating gas is located at a position closer to the floating head than to the fixed tube plate; and the fixed tube plate is equipped with a cooling means for cooling the fixed tube plate.

Preferably, in the above-described reformer, the floating head is supported by a spring hanger fixed to the vessel, the reaction tube is connected to the fixed tube plate via a buffering member, and the reaction tube has a part having an outside diameter smaller than the outside diameter of a part of the reaction tube in which the region for containing the reforming catalyst is formed, on the fixed tube plate side of the region.

Also, in the above-described reformer, the reaction tube is preferably provided in plural numbers, a heat transfer accelerating means is provided in a gap between the reaction tubes, and the cooling means uses water and/or the raw material gas as a cooling medium.

In the reformer in accordance with the present invention, since the flow path for the heating gas and the flow path for process gas are separated from each other, performance degradation in process and heat transfer, which is caused by mixing, does not occur. Also, according to the present invention, high-temperature helium from a nuclear reactor, which is not allowed to be mixed with the reformed gas, or the like can be used as a heating gas.

Since the fixed tube plate located close to the supply port for the heating gas is cooled by the cooling means, the fixed tube plate is kept at a relatively low temperature. On the other hand, the floating head is provided at a position close to the discharge port for the heating gas, the temperature of the heating gas is lower, so that the floating head is not exposed to high temperatures, resulting on a reformer that is mechanically stable.

Also, one end of the reaction tube holding the catalyst is connected to the floating head via the first flexible tube joint, thereby absorbing a difference in thermal expansion between the reaction tubes. Further, the floating head is connected to the raw material gas inlet of the vessel via the second flexible tube joint, by which a large difference in thermal expansion of the whole reformer is absorbed. Therefore, tube buckling, tensile fracture, and the like caused by the difference in thermal expansion can be avoided. Moreover, since both of the first flexible tube joint for connecting the reaction tube to the floating head and the second flexible tube joint for connecting the floating head to the raw material gas inlet are disposed in areas having a relatively low temperature in the reformer, these joints remain reliable in the long-term operation. Also, since these joints are disposed in portions not requiring a heat insulating material, the maintenance of these joints can be performed easily.

In this specification, to distinguish a flexible tube joint for connecting the reaction tube to the floating head from a flexible tube joint for connecting the floating head to the raw material gas inlet, the former is called a first flexible tube joint, and the latter is called a second flexible tube joint.

DETAILED DESCRIPTION OF THE INVENTION

The present invention will now be described with reference to the accompanying drawings. The present invention is not limited to an embodiment described below.

Figure 1:
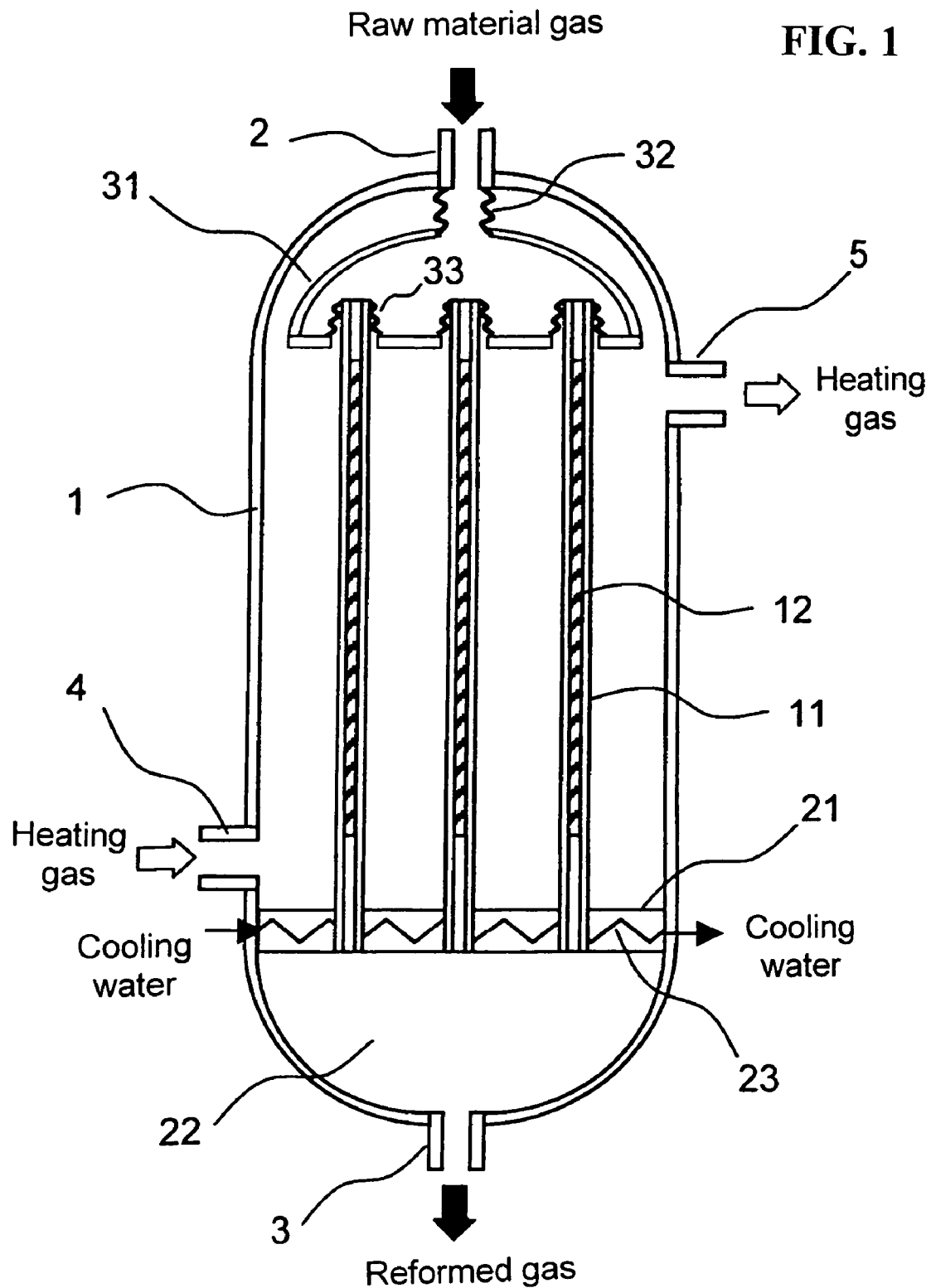
FIG. 1 is a schematic sectional view showing one embodiment of a reformer in accordance with the present invention.

FIG. 1 shows a principal construction of a reformer in accordance with the present invention. In a vessel 1, reaction tubes 11 each having a region for containing a reforming catalyst 12 are provided.

As the vessel, there may be used a known vessel which can be closed against atmosphere, for example, a vessel that is used as a reaction vessel. The vessel may have a tubular shape such as a cylindrical tubular shape or a square tubular shape. Specifically, for example, as shown in FIG. 1, the vessel may have a structure wherein shell covers are installed on both sides of a cylindrical shell.

The reaction tube has the region for containing the reforming catalyst, and in actual use, the reforming catalyst is loaded in this region. From the viewpoint of simplicity of structure, in the reformer, a process gas is preferably caused to flow by one pass. The reaction tube may be a single-structure tube and may be a straight tube. A known reaction tube structure may be adopted appropriately. For example, a perforated plate, a wire mesh, or a grating for supporting a catalyst layer is provided in a single straight tube, by which a reaction tube having a region for containing a catalyst is obtained as a reaction tube for a reformer.

The interior of the vessel is partitioned by a fixed tube plate 21, and thereby a channel 22 is formed. In FIG. 1, the channel 22 is provided in a lower-end part of the cylindrical vessel. The fixed tube plate is fixed to the cylindrical vessel.

One end (the lower end in FIG. 1) of the reaction tube is connected to the fixed tube plate, and the interior of the reaction tube communicates with the channel. In the channel, a reformed gas outlet 3 is provided.

On the other hand, the other end (the upper end in FIG. 1) of the reaction tube is connected to a floating head 31 via a first flexible tube joint 33, and the interior of the reaction tube communicates with the interior of the floating head. As the first flexible tube joint 33, a bellows or the like may be used.

The floating head is connected to a raw material gas inlet 2 provided for the vessel, via a second flexible tube joint 32. In FIG. 1, the floating head is provided in an upper-end part of the cylindrical vessel, and the raw material gas inlet is provided at the top of the vessel.

The vessel is provided with a heating gas inlet 4 and a heating gas outlet 5. The heating gas inlet is provided at a position closer to the fixed tube plate between the fixed tube plate and the floating head. The heating gas outlet is provided at a position closer to the floating head between the fixed tube plate and the floating head.

By the above-described configuration, the raw material gas supplied through the raw material gas inlet is introduced into the reaction tubes through the floating head, which functions as a manifold, and is reformed in the catalyst layers in the reaction tubes. The reformed gas enters the channel, which functions as a manifold, from the reaction tubes, and is discharged through the reformed gas outlet. On the other hand, heating gas supplied through the heating gas inlet 4 comes into contact with the outer walls of reaction tubes, thereby, supplying the heat necessary for the reforming reaction. The heating gas, whose temperature has been decreased by heat loss to the reaction tubes, is discharged through the heating gas outlet 5.

The fixed tube plate is provided with cooling means 23. As the cooling means, water cooling means is preferably used. The reason for this is that water is easily available and has excellent characteristics as a cooling medium because of its high specific heat and latent heat of vaporization. Alternatively, in the cooling means, the raw material gas is preferably used as the cooling medium because the thickness of fixed tube plate can be decreased due to a lower differential pressure acting on the tube plate, and the raw material gas can be preheated at the same time the fixed tube plate is being cooled. A liquid other than water, or in some cases a gas, such as air, may be used as the cooling medium.

Regarding the shape of the reformer, a vertical type or a horizontal type may be used. From the viewpoint of restraining deformation of reaction tube, the vertical type in which the reaction tubes are provided vertically is preferable. Although FIG. 1 shows a vertical type in which the floating head is located in an upper part, the floating head may be located in an upper part or in a lower part. In other words, in FIG. 1, the upward direction in the paper may correspond to the vertically upward direction, or may correspond to the vertically downward direction.

As the heating gas, any gas hot enough to provide the necessary heat for heating the reaction tubes may be used appropriately. For example, combustion gas obtained by burning various types of fuels, a hot gas obtained from other equipment, such as a secondary reformer, or high-temperature helium obtained from a nuclear reactor may be used.

Any known raw materials for the manufacturing of a synthesis gas by a steam reforming reaction, such as desulfurized natural gas, may be used. The raw material gas may be premixed with the reforming steam as appropriate.

For the operation of the reformer, a reforming catalyst is loaded in the reaction tubes. Any known catalyst capable of accelerating steam reforming reaction, such as a nickel-based catalyst, as disclosed in the aforementioned U.S. Pat. No. 4,990,481 or U.S. Pat. No. 5,100,857, may be used.

Reforming reaction operating conditions used in known steam reforming techniques may be used appropriately. For example, the raw material gas is introduced into the reaction tubes at a temperature between about 400° C. and 650° C., and the reformed gas is discharged from the reaction tubes at a temperature between about 700° C. and 900° C. The heating gas is introduced into the reformer vessel at a temperature between about 800° C. and 1000° C., and, after accomplishing countercurrent heat exchange with the process gas, is discharged at a temperature between about 500° C. and 700° C. Even in such a situation, by cooling the fixed tube plate by water or other cooling means, the temperature of the fixed tube plate can be kept between about 100° C. and 300° C.

As for the members constituting the reformer, any known material used in the construction of a reformer may be selected and used appropriately.

The reformer in accordance with the present invention can easily be scaled up in size because thermal expansion can be absorbed by a simple construction with high reliability. According to the present invention, a reformer, for example, having an inside diameter between about 500 mm and 6000 mm can be obtained easily.

EXAMPLES

Figure 2:
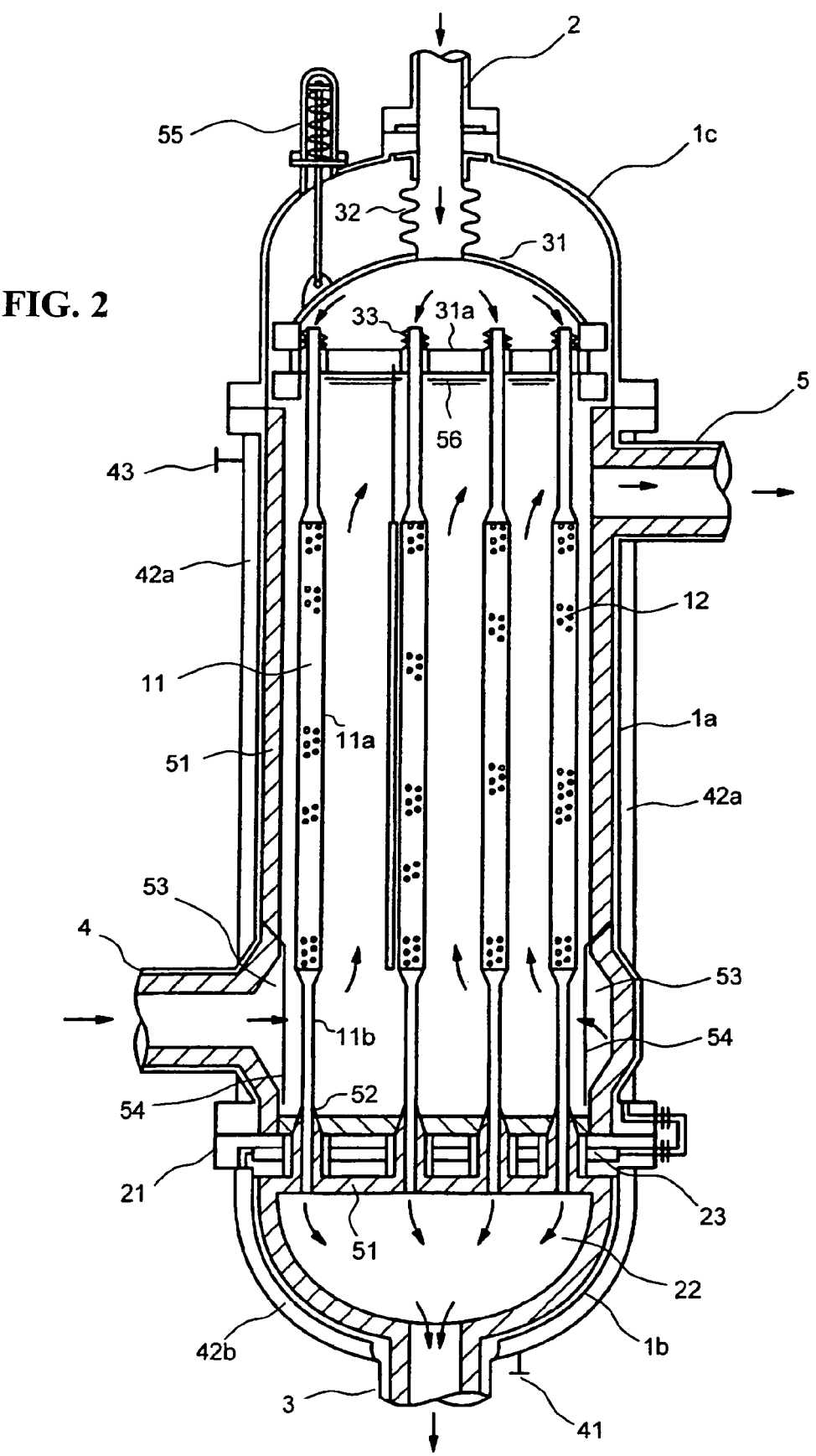
FIG. 2 is a schematic sectional view showing one example of a reformer in accordance with the present invention.

An example of a reformer in accordance with the present invention is shown in FIG. 2. In this figure and the following description, explanation is given of a vertical reformer having the floating head in an upper part thereof. However, the reformer may be of a vertical type or a horizontal type, and the floating head may be located in an upper part or in a lower part.

The vessel of the reformer is made up of a shell 1a and shell covers 1b (shell cover on the fixed tube plate side) and 1c (shell cover on the floating head side, namely, a floating head cover) provided below and above the shell, respectively.

The plurality of reaction tubes 11 each holding the catalyst 12 necessary for the reforming reaction are arranged, and the lower end of each of the tubes is attached to the fixed tube plate 21 which is fixed to the vessel. The upper end of the tube is attached to a floating tube plate 31a of the floating head 31 via a first flexible tube joint 33, such as a bellows.

The cooling means 23, such as a water cooling means, is provided for the fixed tube plate 21. In this example, the fixed tube plate is formed as described below. Two parallel metal plates are arranged with a clearance provided therebetween, and the periphery thereof is sealed. In a location through which the reaction tube passes, a tube having an inside diameter larger than the outside diameter of the reaction tube is passed through both metal plates and is sealed. Thereby, a gap is formed between the two metal plates, and a fluid such as water can flow therein as a cooling medium. By providing an outlet and inlet for the fluid appropriately, the cooling medium can be supplied into and discharged from the gap.

In this example, water-cooling jackets 42b and 42a are provided around the shell cover 1b and the shell 1a, respectively, and the cooling water introduced from an cooling water inlet 41 passes through the jacket 42b, the water cooling means 23, and the jacket 42a in succession, and is discharged through a cooling water outlet 43. The shell cover 1c on the floating head side is not cooled since it is not exposed to the heating gas.

Figure 3:
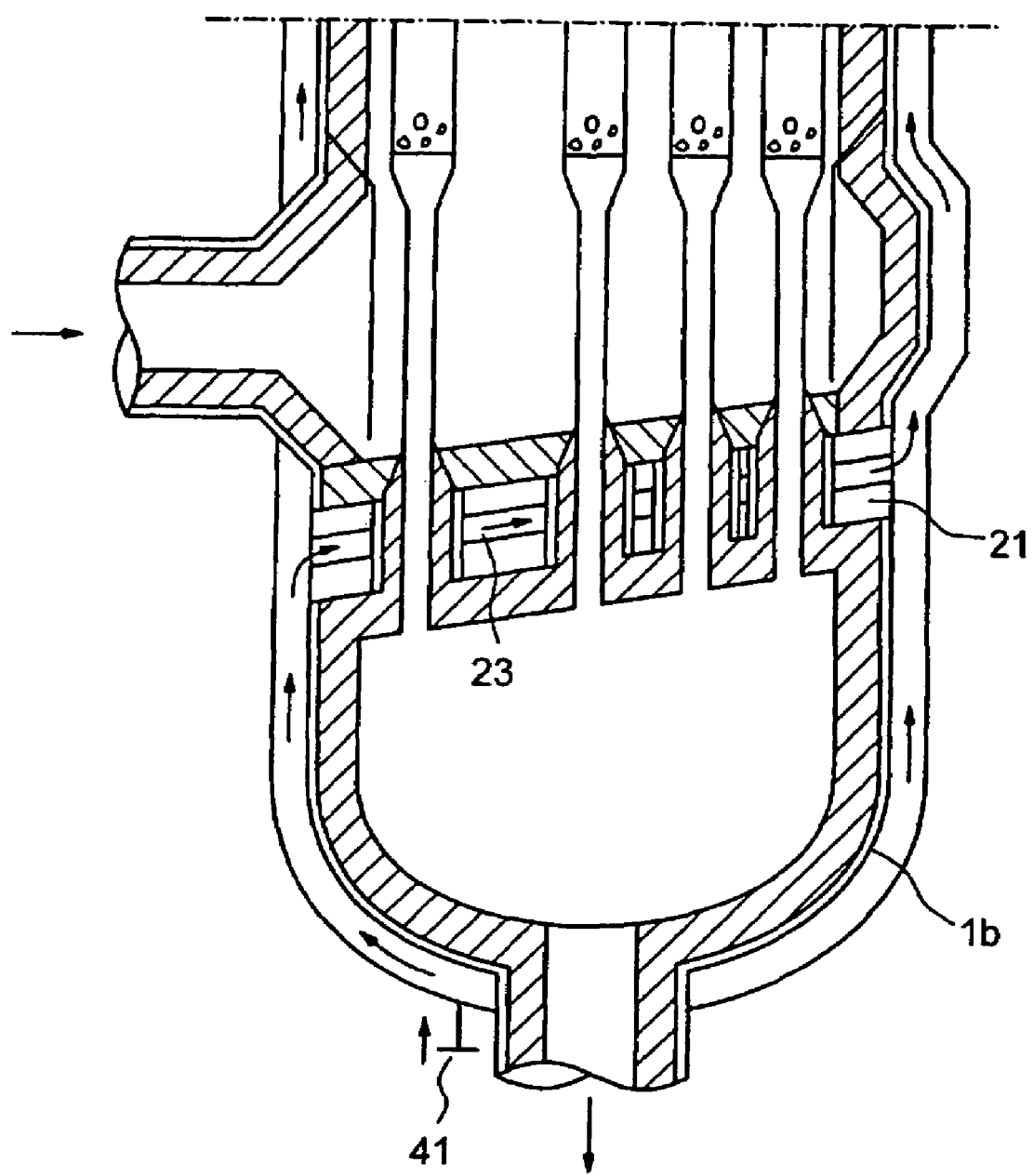
FIG. 3 is a schematic partial sectional view for illustrating a modified example of a fixed tube plate portion.

The fixed tube plate may be water-cooled by a forced water cooling method in which cooling water is forcedly caused to flow or by a natural circulation water cooling method in which cooling water flows due to natural circulation. In the case of the natural circulation cooling, as shown in FIG. 3, the fixed tube plate is disposed so as to be inclined slightly, not horizontally, so that the flow of fluid (water) can be guided by providing a gradient to the water flow path (cooling means 23).

To cool the fixed tube plate, a liquid other than water or a gas, such as the raw material gas or air, may be used as the cooling medium. In the case where the raw material gas having a relatively low temperature is used as a cooling medium, for example, the raw material gas having an ordinary temperature may be caused to flow in the cooling flow path (cooling means 23) to cool the fixed tube plate and also to preheat the raw material gas; further heated appropriately; mixed with another fluid such as steam as appropriate; and then charged in the raw material gas inlet and reformed. The reformed gas discharged through the reformed gas outlet may be further subjected to secondary reforming to form a high-temperature gas, and this gas may be introduced into the heating gas inlet 4 as the heating gas. Thus, it is possible to let the interior of the cooling means, the interior of the reaction tubes, the interior of the channel, and a part of the interior of the vessel above the fixed tube plate be one continuous space of a single line by connecting these by piping. In this case, a differential pressure acting on the fixed tube plate is only the differential pressure caused by a part of the pressure loss of this line. That is, by using the raw material gas as a cooling medium, the fixed tube plate can be designed against the differential pressure, namely, what is called differential pressure design can be made. Such design is preferable because the fixed tube plate can be made thin. The thin fixed tube plate is advantageous in terms of thermal stress. The raw material gas having a relatively low temperature means a raw material gas having a temperature enough to cool the fixed tube plate to a desired temperature. For example, in the case where the raw material gas having an ordinary temperature is mixed with the reforming steam and preheated to a temperature between about 400° C. and 650° C. and introduced into the reaction tubes of the reformer as described above, the raw material gas having an ordinary temperature may be used as a cooling medium for cooling the fixed tube plate, and the raw material gas may be preheated at the same time the fixed tube plate is being cooled.

Figure 7:
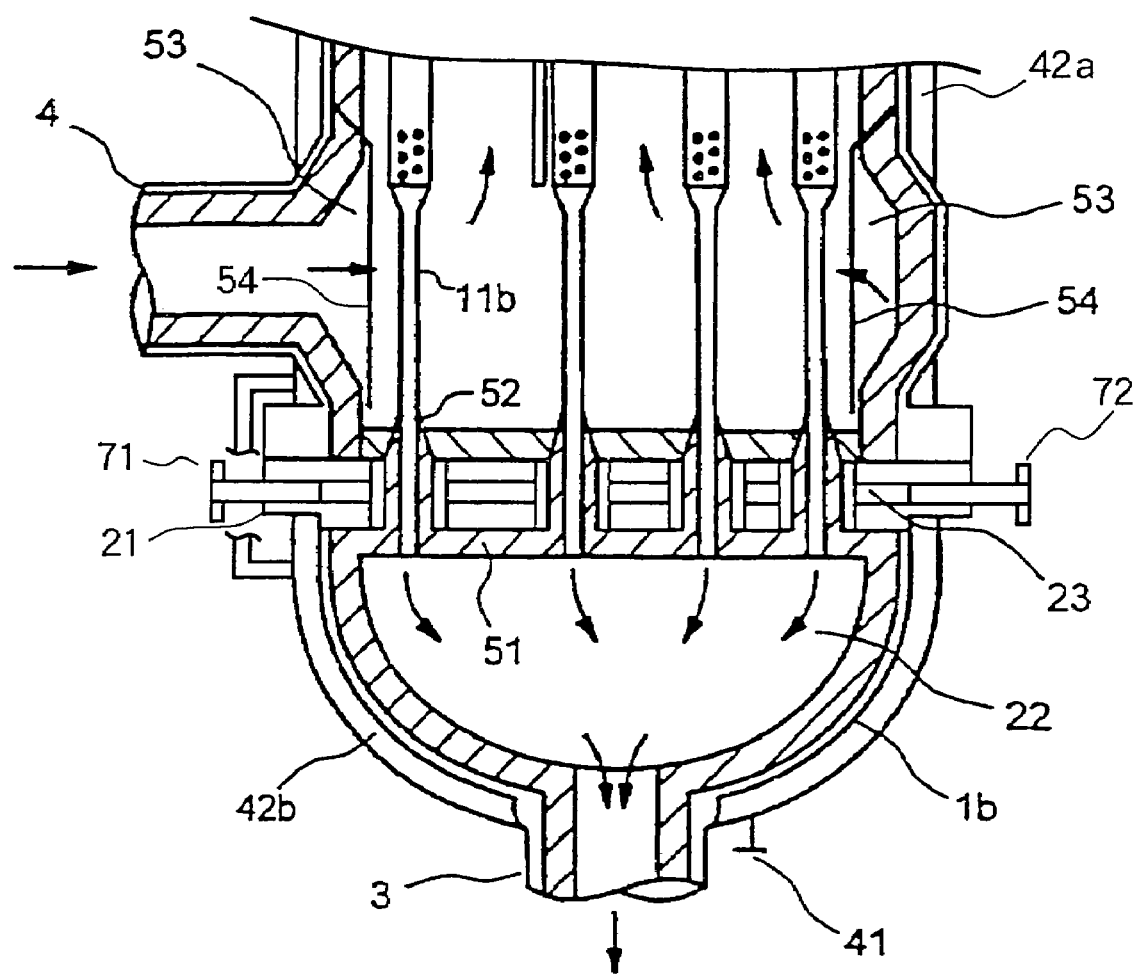
FIG. 7 is a schematic partial sectional view for illustrating another modified example of a fixed tube plate portion.

Here, the case in which the fixed tube plate 21 is cooled by a gas is explained with reference to FIG. 7. A cooling gas inlet 71 for introducing a cooling gas into the gap (cooling medium flow path) of the cooling means 23 and a cooling gas outlet 72 for withdrawing the cooling gas out of the gap are connected to the gap. Thereby, the cooling gas can be caused to flow in the cooling means. In the example shown in FIG. 2, cooling water flows from the water-cooling jacket 42b to the water-cooling jacket 42a through the cooling means. However, in this case, the water-cooling jacket 42a and the water-cooling jacket 42b are connected to each other, and water flows from the water-cooling jacket 42b to the water-cooling jacket 42a without passing through the cooling means.

It is preferable that a heat insulating material 51 be installed all over the upper surface, the lower surface and the surface of the tube hole part of the fixed tube plate to thermally protect the fixed tube plate from the heating gas and reformed gas flowing in the reformer. The heat insulating material 51 may also be installed on the shell 1a, the heating gas inlet 4, and the heating gas outlet 5 that form the flow path for heating gas, and the heat insulating material 51 may also be installed on the channel 22 and the reformed gas outlet 3 in which the reformed gas having a relatively high temperature flows. In this example, the heat insulating material is provided on the inner wall surface of these elements. Since the shell cover 1c on the floating head side has a relatively low temperature, there is little need for providing the heat insulating material. The case where the heat insulating material is not provided on the shell cover 1c is preferable because of easier maintenance of the second flexible tube joint and the floating head that are located inside the shell cover 1c. Since the shell cover 1c is fixed to the shell 1a by a flange, if necessary, the maintenance can be performed by removing the shell cover to obtain access to the interior. Needless to say, for example, in the case where the leakage of gas from the flange portion during operation is unacceptable, the shell cover 1c may be fixed to the shell 1a by welding. Also, since a dome-shaped portion of the floating head is fixed to the floating tube plate by a flange, if necessary, maintenance can be performed by removing the dome-shaped portion for access. Needless to say, the floating head may also be fixed to the floating tube plate by welding in place of the flange in the case where the leakage of gas from the flange portion during operation is unacceptable.

Figure 8:
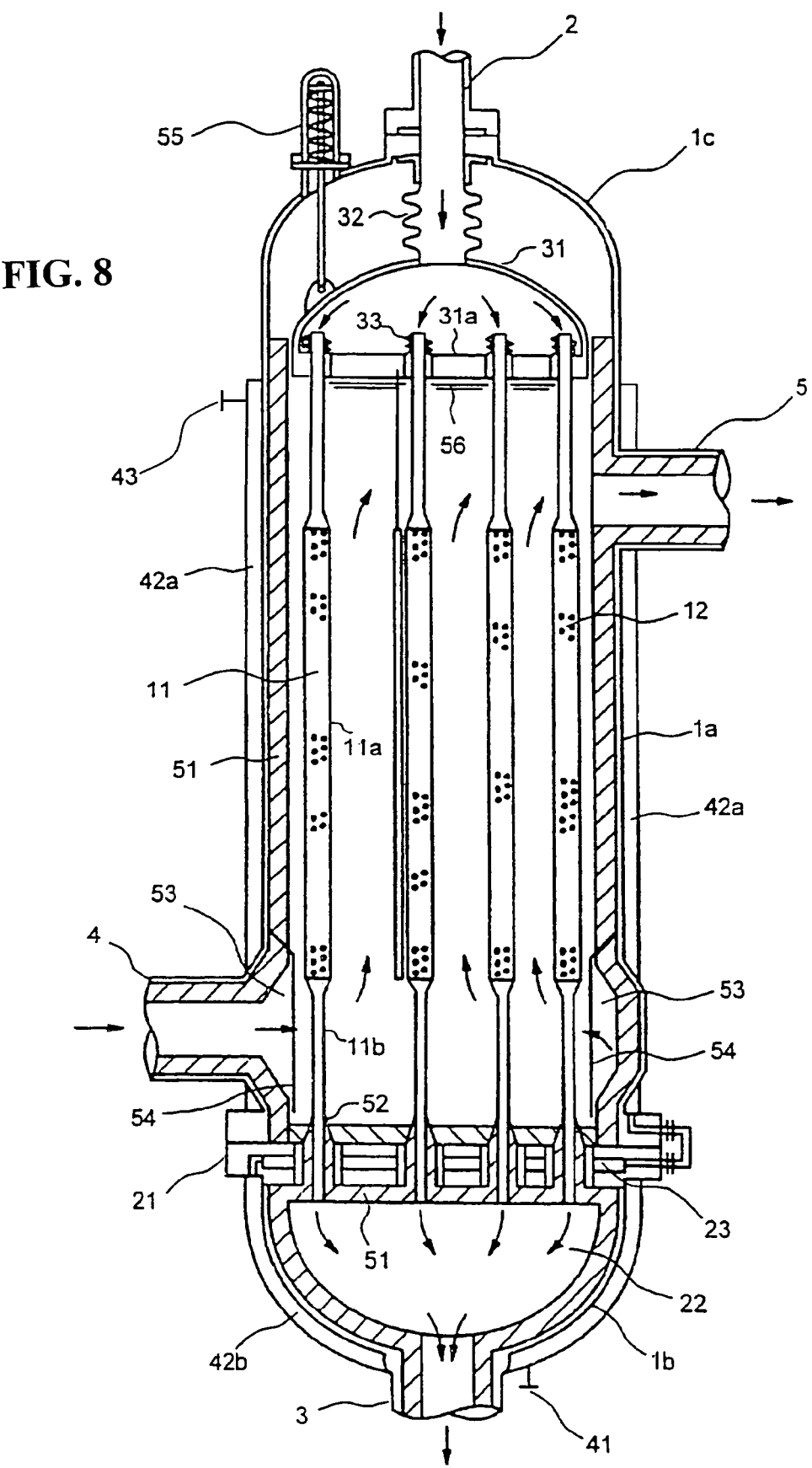
FIG. 8 is a schematic sectional view showing another example of a reformer in accordance with the present invention.

An example of the reformer in which the shell cover 1c is fixed to the shell 1a by welding and the dome-shaped portion of the floating head 31 is fixed to the floating tube plate 31a by welding is explained with reference to FIG. 8. As shown in the figure, since the shell cover 1c is integrated with the shell by welding, and also the dome-shaped portion of the floating head is integrated with the floating tube plate by welding, the leakage of gas from these connecting portions can surely be prevented. Especially in the case of a large-size reformer, the fixing by welding is often more practical than the fixing by flange.

A portion of the reaction tube near the fixed tube region may have an outside diameter smaller than the outside diameter of the portion containing the reforming catalyst. For example, the lower part 11b (without catalyst) of the reaction tube may be made thinner than the part 11a containing the catalyst layer. By supplying heating gas to the thin reaction tube portion, a preferable flow path area can be given to the heating gas which flows into the vessel, and the heating gas can be spread more uniformly over the whole cross section (horizontal cross section in FIG. 2) of the reformer. Also, by providing the thin reaction tube portion, the occurrence of thermal stress due to nonuniform temperature of tube can be restrained.

A space for distributing the heating gas in the circumferential direction of the vessel, namely, a vapor belt 53, may be provided by increasing the inside diameter of the vessel in the region in which heating gas is introduced, and by arranging a distributor 54 having the same diameter as the inside diameter of the other part of the vessel. The distributor may be formed by arranging a perforated plate in a cylindrical form. By the arrangement of the distributor as well, the heating gas can be spread more uniformly over the whole cross section (horizontal cross section in FIG. 2) of the reformer.

Figure 9:
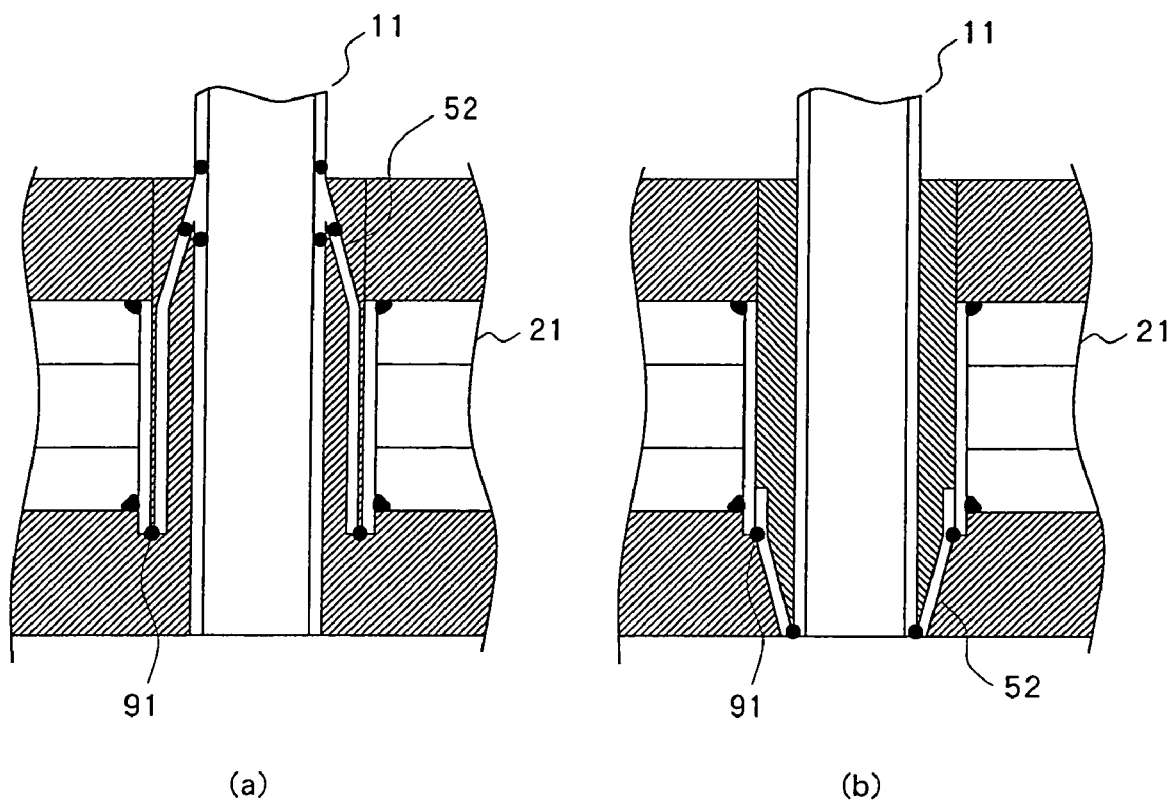
FIGS. 9(a) and 9(b) each is a partial sectional view for illustrating installation of a buffering member.

The reaction tube may be fixed directly to the fixed tube plate, but it is preferably attached to the fixed tube plate via a buffering member 52. The buffering member prevents the occurrence of excessive thermal stress by providing proper insulation so that the temperature changes gradually. As the buffering member, for example, a skirt-shaped member made of a metal plate may be used. The buffering member may be attached to any position of the upper surface, the lower surface, and the middle portion of the fixed tube plate. FIG. 9(a) shows an example in which the buffering member is attached to the upper surface of the fixed tube plate, and FIG. 9(b)

shows an example in which the buffering member is attached to the lower surface of the fixed tube plate. In both the cases, final welding for attaching the buffering member to the fixed tube plate can be performed in a final weld portion 91 from the easily accessible lower side of the fixed tube plate.

Figure 4:
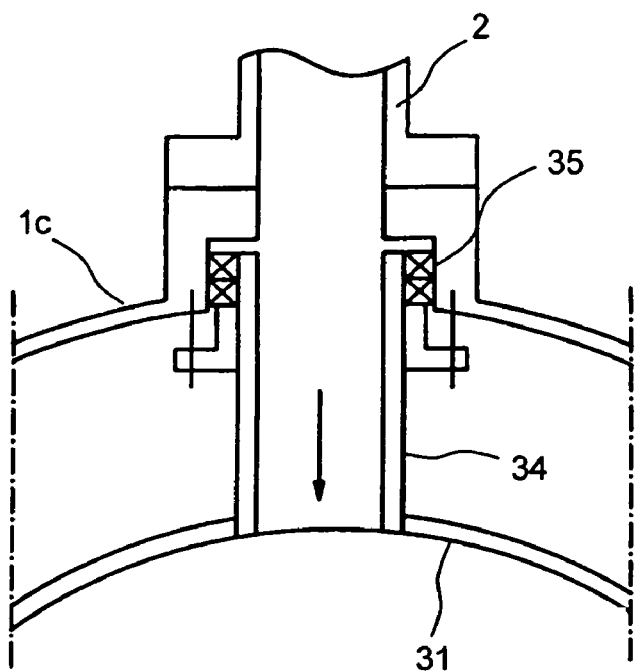
FIG. 4 is a schematic partial sectional view for illustrating a modified example of a second flexible tube joint.

The raw material gas inlet 2 attached on top of the reformer and the floating head 31 are connected to each other via the second flexible tube joint 32. As the second flexible tube joint, an expansion joint such as a bellows may be used. Also, in the case where leakage is allowed between the process gas and the heating gas, as shown in FIG. 4, as the second flexible tube joint between the floating head 31 and the raw material gas inlet 2, a sealed sliding joint 34 sealed by a gland packing 35 may be used in place of the expansion joint. For example, in the case where combustion gas is used as the heating gas, the leakage from process gas to heating gas is often allowed to some extent.

Figure 10:
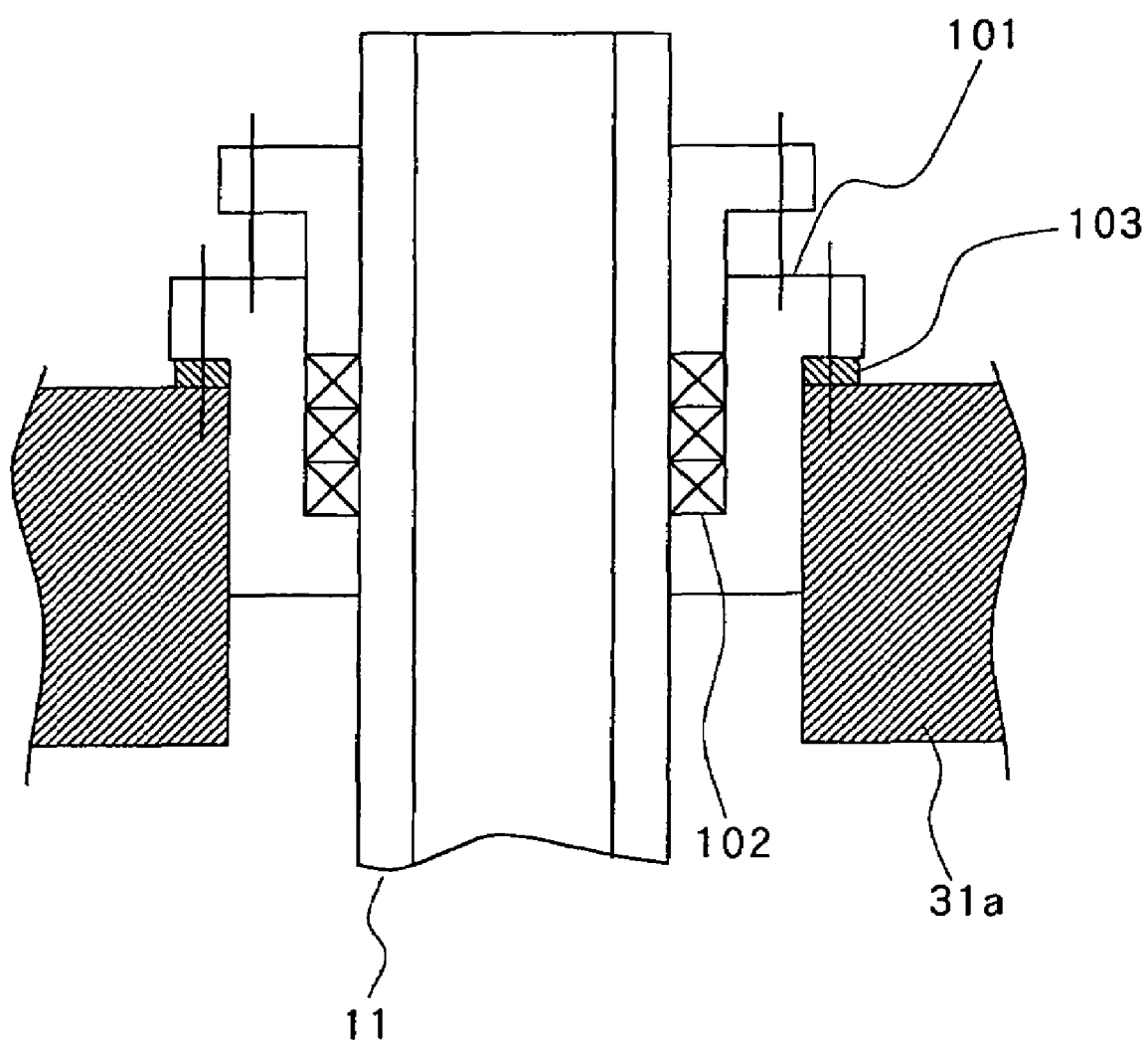
FIG. 10 is a schematic partial sectional view for illustrating a modified example of a first flexible tube joint.

The reaction tube 11 and the floating tube plate 31a are connected to each other via the first flexible tube joint. As the first flexible tube joint, an expansion joint such as a bellows may be used. In the case where leakage is allowed between the process gas and the heating gas, as shown in FIG. 10, as the first flexible tube joint between the reaction tube 11 and the floating tube plate 31a, a sealed sliding joint 101 sealed by a gland packing 102 may be used in place of the expansion joint. For example, in the case where combustion gas is used as the heating gas, leakage from the process gas to the heating gas is often allowed to some extent. A housing for holding or housing the gland packing 102 may be formed by directly machining the floating tube plate 31a. However, from the viewpoint of ease of manufacture and maintenance, as shown in FIG. 10, a structure is preferable in which the housing is a member separate from the floating tube plate, and this housing is attached to the floating tube plate by using a gasket 103.

Figure 11:
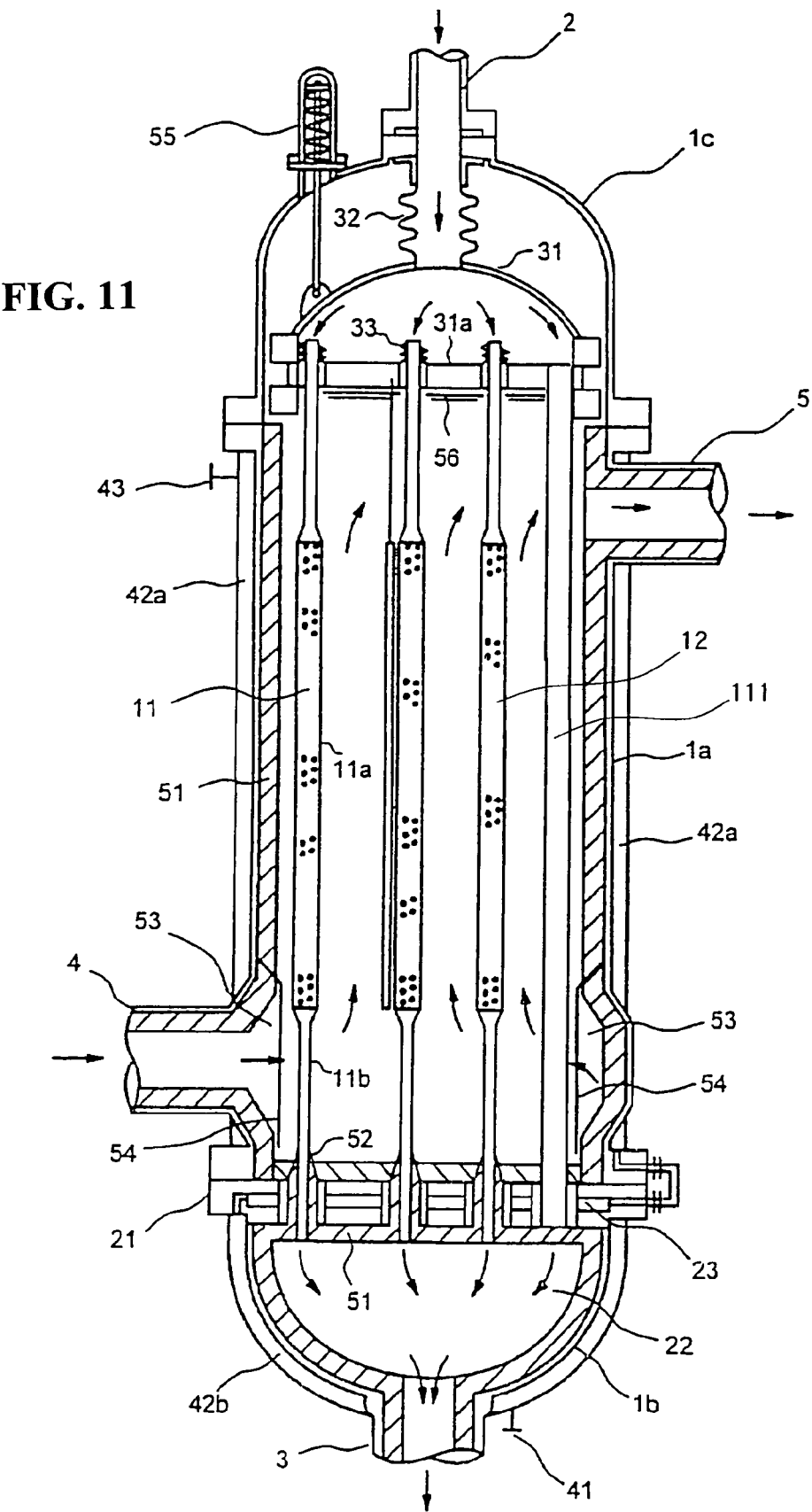
FIG. 11 is a schematic sectional view showing a further example of a reformer in accordance with the present invention.

The floating head is mechanically separated from a reformer body by the second flexible tube joint 32 and the first flexible tube joint 33, and is in a floating state. Therefore, as shown in FIG. 11, a support member 111 for mechanically supporting the floating head may be provided. As the support member, for example, a hollow or solid cylindrical body such as a round bar or a round pipe may be used. One end of the support member is fixed to the floating tube plate, and the other end thereof is fixed to the fixed tube plate. To stably support the floating head, three support members are preferably arranged so as to be separate from each other. Also, from the viewpoint of restraining deformation caused by a difference in thermal expansion, it is preferable that a material having almost the same thermal expansion coefficient as that of the reaction tube 11 be used as the support member.

The second flexible tube joint 32 can be designed so as to absorb an average elongation difference between the tube 11 and the reformer shell 1a, and the first flexible tube joint 33 for connecting the reaction tube end to the floating tube plate can be designed so as to absorb a difference in elongation between the tubes caused by differences in conditions between the tubes (difference in the amount of loaded catalyst, difference in tube inside diameter, difference in flow rate distribution, difference in reaction, difference in heat transfer, and others). By designing in such a manner, the function of the flexible tube joint can be shared, and a more reasonable and highly reliable design can be made against the elongation of tubes.

Figure 5:
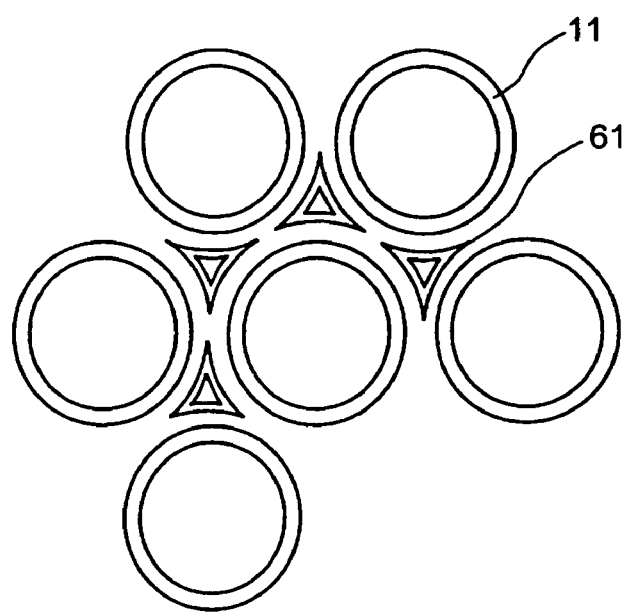
FIG. 5 is a schematic sectional view showing an example of heat transfer accelerating means.
Figure 6:
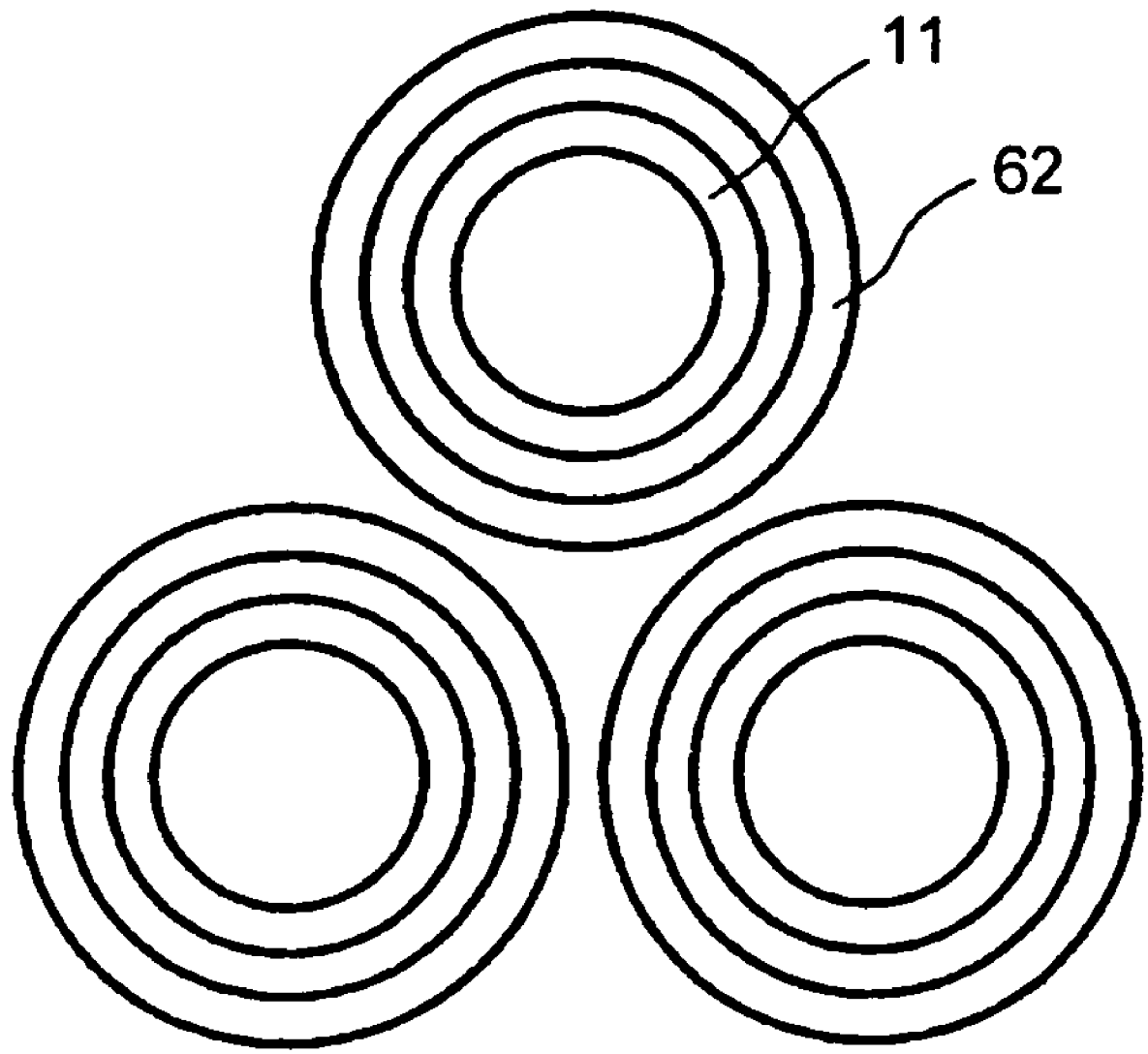
FIG. 6 is a schematic sectional view showing another example of heat transfer accelerating means.

The reaction tubes are preferably arranged as closely with each other as possible so that the heating gas flows on the shell side at a high flow velocity, by which heat transfer from the heating gas to the reaction tubes can be accelerated. In order to accelerate heat transfer from the heating gas to the reaction tubes, heat transfer accelerating means may be provided in a gap between the reaction tubes. As the heat transfer accelerating means, a substance or a member capable of accelerating heat transfer can be used. For example, as shown in FIG. 5, by installing spacers 61 in gaps between the reaction tubes, heat transfer from the heating gas to the tubes can be accelerated by an increase in heat transfer due to high gas flow velocity obtained by the narrowed flow path on the shell side and by radiation heat transfer from the spacers, which are heated in the same way as the tubes, to the tubes. Or, as shown in FIG. 6, sheath tubes 62 may be installed on the outside of the reaction tubes so as to cause the heating gas to flow in gaps between the sheath tubes and the reaction tubes. As the heat transfer accelerating means, a metal mesh may be used other than the spacer and the sheath tube.

In a lower part of the reformer, the nozzle 3 is installed to discharge the reformed gas from the channel 22 to the outside of the system.

In a lower part of the side surface of the reformer and above the fixed tube plate, the heating gas inlet 4 is provided to introduce heating gas. In an upper part of the side surface of the reformer and below the floating tube plate, the heating gas outlet 5 is provided to discharge the heating gas having given heat necessary for the reforming reaction to the reaction tubes to the outside of the system.

A spring hanger 55 may be attached to the shell cover 1c on the floating head side to support the weights of the reaction tubes and the floating head, thereby it is possible to reduce loads acting at the lower parts of the heated reaction tubes including the thin parts 11b of the tube.

By providing a baffle 56 on the inner side (the flow path side of the heating fluid) of the floating tube plate 31a, heat transfer from the heating fluid to the floating tube plate can be restrained, and it is possible to restrain increase in temperatures of members located on the outer side of the floating tube plate, such as the floating head 31 and the flexible tube joint 32.

What is claimed is:

1. A reformer configured to obtain a reformed gas from a raw material gas, comprising:
    a vessel;
    a fixed tube plate disposed inside of the vessel, the fixed tube plate partitioning the vessel to form a channel in an end portion of the vessel;
    a floating head disposed inside of the vessel on the other end portion thereof;
    a reaction tube containing a reforming catalyst, one end of the reaction tube being connected to the fixed tube plate in communication with the channel and the other end being in communication with an interior of the floating head via a first flexible tube joint;
    a raw material gas inlet in communication with the interior of the floating head via a second flexible tube joint;
    a reformed gas outlet in communication with the channel;
    a heating gas inlet and a heating gas outlet disposed between the fixed tube plate and the floating head, the heating gas inlet being located at a position closer to the fixed tube plate and the heating gas outlet being located at a position closer to the floating head; and
    means for cooling the fixed tube plate; wherein the floating head is supported by a spring hanger fixed to the vessel.

2. The reformer according to claim 1, wherein the reaction tube is connected to the fixed tube plate via a buffering member.

3. The reformer according to claim 2, wherein the buffering member is a skirt-shaped member including a metal plate.

4. The reformer according to claim 1, wherein a portion of the reaction tube containing the reforming catalyst has an outside diameter larger than an outside diameter of a portion of the reaction tube adjacent to the fixed tube plate.

5. The reformer according to claim 1, wherein a plurality of the reaction tubes is provided, and further comprising means for accelerating heat transfer between the plurality of reaction tubes and the heating gas provided in gaps between the reaction tubes.

6. The reformer according to claim 5, wherein the means for accelerating heat transfer between the plurality of reaction tubes and the heating gas comprises:
 a spacer having approximately triangular cross section, or a sheath tube.

7. The reformer according to claim 1, wherein the cooling means is a water cooling means.

8. The reformer according to claim 1, wherein the cooling means uses the raw material gas as a cooling medium.

9. The reformer according to claim 1, wherein the heating gas is heated helium from a nuclear reactor.

10. A reformer configured to obtain a reformed gas from a raw material gas, comprising: a vessel;
 a fixed tube plate disposed inside of the vessel, the fixed tube plate partitioning the vessel to form a channel in an end portion of the vessel;
 a floating head disposed inside of the vessel on the other end portion thereof; a reaction tube containing a reforming catalyst, one end of the reaction tube being connected to the fixed tube plate in communication with the channel and the other end being in communication with an interior of the floating head via a first flexible tube joint;
 a raw material gas inlet in communication with the interior of the floating head via a second flexible tube joint;
 a reformed gas outlet in communication with the channel;
 a heating gas inlet and a heating gas outlet disposed between the fixed tube plate and the floating head, the heating gas inlet being located at a position closer to the fixed tube plate and the heating gas outlet being located at a position closer to the floating head; and a means for cooling the fixed tube plate;
 and wherein the fixed tube plate is inclined with respect to an axis of the vessel.

11. The reformer according to claim 10, wherein the fixed tube plate is cooled by natural circulation of water.

12. The reformer according to claim 1, further comprising: an external cooling jacket disposed around the vessel.

13. The reformer according to claim 1, wherein a diameter of the vessel is between 500 and 6000 mm.

14. The reformer according to claim 1, wherein the fixed tube plate comprises two parallel plates disposed with a clearance therebetween forming a passage for a cooling medium.

15. The reformer according to claim 1, further comprising: an insulating material disposed around the fixed tube plate.

16. The reformer according to claim 1, further comprising:
 a vapor belt located inside of the vessel in a region thereof having an increased inner diameter adjacent to a region where the heating gas is introduced into the vessel.

17. The reformer according to claim 16, further comprising:
 a gas distributor configured to more uniformly distribute the heating gas inside of the vessel.

18. The reformer according to claim 1, wherein the floating head further comprises a baffle configured to minimize heat transfer from the heating gas to the floating head.

19. The reformer according to claim 18, wherein the baffle is provided on a side of the floating tube plate, said side facing the flow-path of the heating fluid.

* * * * *